(12) United States Patent
Slawson et al.

(10) Patent No.: US 7,730,426 B2
(45) Date of Patent: Jun. 1, 2010

(54) VISUAL THESAURUS AS APPLIED TO MEDIA CLIP SEARCHING

(75) Inventors: Dean A Slawson, Redmond, WA (US); Tjeerd Hoek, Kirkland, WA (US); Eric L Brechner, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1029 days.

(21) Appl. No.: 11/449,430

(22) Filed: Jun. 7, 2006

(65) Prior Publication Data

US 2006/0230334 A1 Oct. 12, 2006

Related U.S. Application Data

(63) Continuation of application No. 09/224,009, filed on Dec. 31, 1998, now abandoned.

(51) Int. Cl.
*G06F 17/00* (2006.01)
(52) U.S. Cl. .................. 715/835; 715/838; 707/E17.09
(58) Field of Classification Search .................. None
See application file for complete search history.

(56) References Cited

U.S. PATENT DOCUMENTS

| | | | |
|---|---|---|---|
| 5,493,677 A | 2/1996 | Balogh et al. | |
| 5,696,964 A | 12/1997 | Cox et al. | |
| 5,870,754 A * | 2/1999 | Dimitrova et al. | 707/104.1 |
| 5,893,095 A | 4/1999 | Jain et al. | |
| 5,899,999 A | 5/1999 | De Bonet | |
| 5,983,218 A | 11/1999 | Syeda-Mahmood | |
| 6,199,060 B1 | 3/2001 | Gustman | |
| 6,263,335 B1 | 7/2001 | Paik et al. | |
| 6,269,358 B1 | 7/2001 | Hirata | |
| 6,282,549 B1 | 8/2001 | Hoffert et al. | |
| 6,301,586 B1 | 10/2001 | Yang et al. | |
| 6,308,171 B1 | 10/2001 | De La Huerga | |
| 6,665,686 B1 | 12/2003 | Kagami et al. | |

* cited by examiner

*Primary Examiner*—Doug Hutton
*Assistant Examiner*—James H Blackwell
(74) *Attorney, Agent, or Firm*—Merchant & Gould P.C.

(57) ABSTRACT

A Visual Thesaurus program is provided that allows a user to find media clips through successive queries by example. Clips similar to the example clip may be retrieved based on artistic style, color and shape, or keywords. Clips retrieved based on keywords may be found based on a single keyword, multiple keywords, or all keywords associated with the example clip. The keyword may be the clip format (e.g., "mpeg" or "gif").

20 Claims, 17 Drawing Sheets

VISUAL THESAURUS AS APPLIED TO MEDIA CLIP SEARCHING

CROSS-REFERENCE TO RELATED APPLICATION

This application is a continuation of application Ser. No. 09/224,009, filed Dec. 31, 1998, the benefit of the filing date of which is hereby claimed under 35 U.S.C. §120.

BACKGROUND

Microsoft CLIP GALLERY is a multimedia application program produced by Microsoft Corporation, Redmond, Wash., for previewing, and inserting into documents, multimedia, such as clip art, pictures, sounds, video clips, and animation art (collectively referred to as "clips"). Information about clips is stored in a catalogue. The catalogue contains a small graphical representation, known as a thumbnail, of the clip, as well as information about the clip, such as the artistic style of the clip, keywords that describe the clip (or some aspect of the clip), categories to which the clip belongs, and the location of the clip. Clips in a CLIP GALLERY catalogue are organized according to type of clip (e.g., sound, video, picture, etc.). A user can also use the CLIP GALLERY program to organize clips by category or keyword. The CLIP GALLERY program can be invoked stand-alone or by another application program, such as Microsoft WORD, also produced by Microsoft Corporation, Redmond, Wash. Within a category (or the entire CLIP GALLERY catalogue), a user may search by manually entering keywords.

In the past, it has been difficult to perform successive searches through a large volume of clips included in the catalogues of a CLIP GALLERY program and other similar programs. As a result of this, users often do not succeed in finding the image they need, even if that image is available in the gallery. This result is partially true because many users of such programs are not skilled at formulating complex queries. In many instances, users, even skilled users, do not know what search term(s) to apply because graphics and sounds are difficult to describe in words. As a result, a suitable search tool should be able to accommodate a user who does not know exactly what he or she is looking for, but will "know it when I see it." Additionally, the search tool should assist a user in finding clips that match an example clip in visual style so that a document can be produced that contains graphics that are consistent in appearance. The present invention is directed to providing such a search tool.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention is directed to a method, system, and computer-readable medium for searching a clip catalogue containing a plurality of multimedia clips based on one or more parameters of a selected clip to locate similar clips as disclosed.

In accordance with further aspects of this invention, the one or more selected parameters are keywords. A clip can have a variety of keywords associated with it.

In accordance with other aspects of this invention, the one or more selected parameters include artistic style. If the user elects to locate similar clips based on artistic style, the clip catalogue is searched and a thumbnail of each of the clips in the clip catalogue having the same artistic style as the selected clip is displayed. Preferably, clips of all categories are displayed, with the category or categories of the selected clip being displayed first.

In accordance with still other aspects of this invention, artistic style is an optional keyword associated with a clip. Preferably, a user may not add or modify the artistic style of a clip, i.e., the optional artistic style keyword associated with a clip is static.

In accordance with yet another aspect of this invention, one of the keywords designates the format of the clip, such as "mpeg," or "gif."

In accordance with a yet further aspect of this invention, all of the keywords associated with the clip are displayed in a Find Similar Clips user interface.

In accordance with yet another aspect of this invention, similar clips are located based on the keywords associated with the selected clip, that is, any clip in the clip catalogue having an associated keyword that matches at least one of the keywords of the selected clip is located.

In accordance with a still further aspect of this invention, clips similar to the selected clip are located based on the color and/or shape of the selected clip. If the user chooses to locate clips based on color and shape, a thumbnail of each of the clips having a similar color scheme and shape as the selected clip is displayed.

In accordance with yet still another aspect of this invention, a user interface that allows a user easy accessibility to other functions of the multimedia applications program including the clip catalogue is provided. Preferably, the other functions include inserting a chosen clip into a document, playing or previewing a chosen clip, and adding a chosen clip to a category. Preferably, the user interface minimizes obscuring of objects displayed on the screen, i.e., clip thumbnails. It is also preferable that any user interface screens accessed (i.e., additional functions) also minimize display obstruction.

In accordance with a yet still further aspect of this invention, clips are sorted based on media type. Preferably, the media types include Clip Art/Pictures, Sounds, Videos and Text. If the user requests a clip preview, and the clip is a Clip Art/Pictures clip, an actual size version of the clip is displayed. If the user requests a clip preview, and the clip is a Sounds clip, audio is played. If the user requests a clip preview, and the clip is a Videos clip, video is played. If the user requests a clip preview, and the clip is a text clip, the full text is displayed. For example, if the text clip is a document, the document is displayed, and if the text clip is an annotation (e.g., handwritten note), the annotation is displayed.

In accordance with yet a further aspect of this invention, clips are also sorted based on category. Categories include several pre-defined topics. Preferably, a user can add a clip to any desired category or categories.

As will be readily appreciated from the foregoing summary, the invention provides a search tool for searching a clip catalogue containing a plurality of multimedia clips that allows a user to find a clip that the user will "know it when I see it." Selecting one or more desirable parameters of a selected clip allows a user to rapidly locate clips of like type being sought so that a final decision can be quickly reached regarding a clip to be used in, for example, a document being prepared. The invention avoids the need to formulate complex, difficult queries.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention is directed to a computer program for searching a clip catalogue containing a plurality of multimedia clips based on one or more selected parameters of a selected clip to locate similar clips. Called a Visual Thesaurus, the invention is a search tool designed for use on a computer, such as a personal computer or a networked computer system running a multimedia application program that contains a catalogue of clips, such as the CLIP GALLERY multimedia program produced by Microsoft Corporation, Redmond, Wash.

Figure 1:
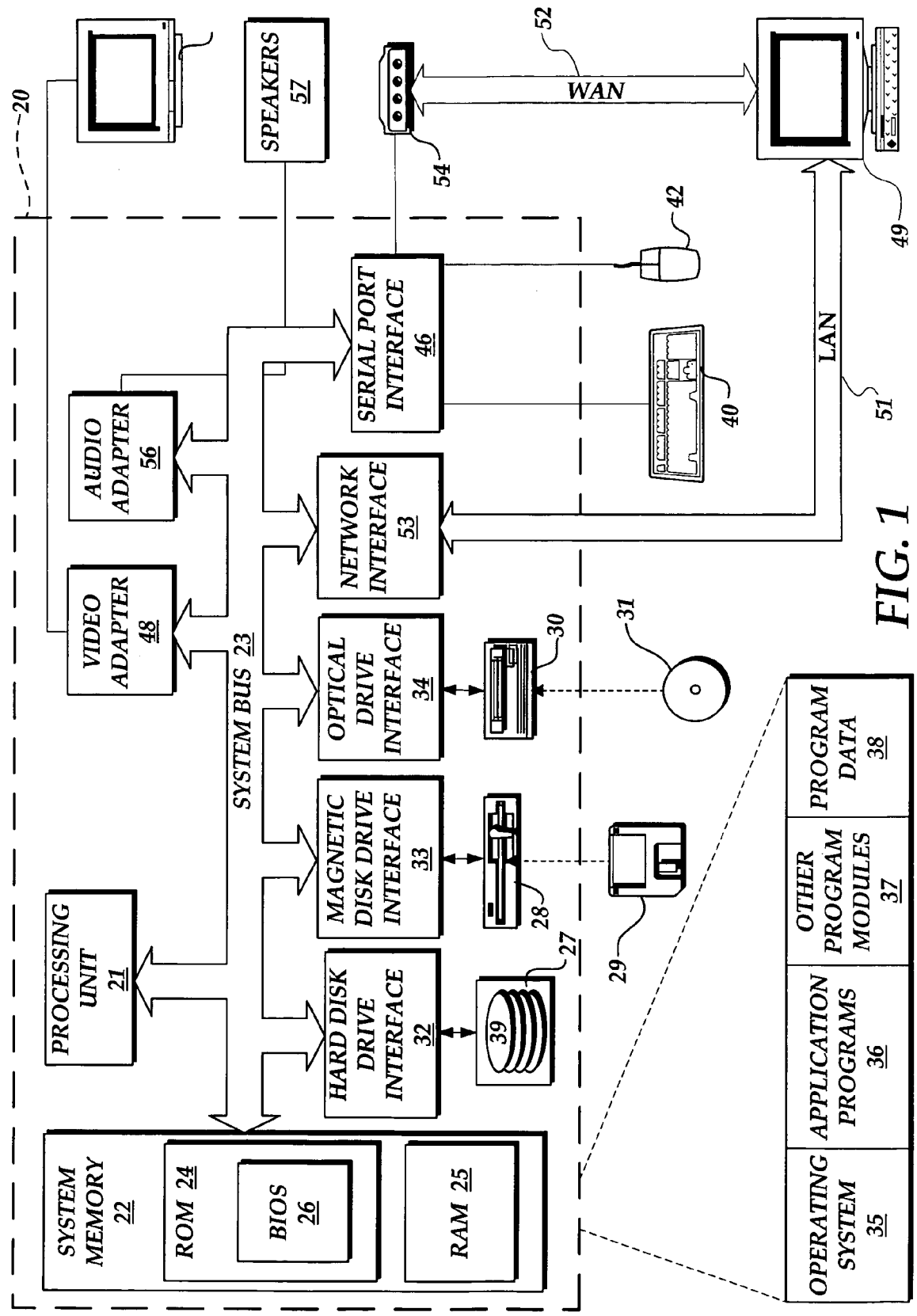
FIG. 1 is a block diagram of a general purpose computer system suitable for implementing the present invention.

FIG. 1 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that helps to transfer information between elements within the personal computer 20, such as during start-up, is stored in ROM 24. The personal computer 20 further includes a hard disk drive 27 for reading from and writing to a hard disk 39, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules, and other data for the personal computer 20. Although the exemplary environment described herein employs a hard disk 39, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 39, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may also be connected by other interfaces, such as a parallel port, game port or a universal serial bus (USB). A display in the form of a monitor 47 is also connected to the system bus 23 via an interface, such as a video card or adapter 48. Preferably, the video card or adapter includes a 3D rendering engine implemented in hardware. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

The present invention, implemented on a system of the type illustrated in FIG. 1 and described above, allows a user to, efficiently and effectively search a clip catalogue to locate the clip that most closely represents what the user is seeking. As will be better understood from the following description, this is accomplished by a user selecting one or more parameters of a selected clip. Based on the selection a Visual Thesaurus program formed in accordance with the invention locates clips in the clip catalogue that most closely match the selected parameters. The parameters include, but are not limited to, artistic style, type of clip, color and shape, media type (audio or video), predefined topic category, etc.

FIGS. 2A-2G illustrate an example of a series of user interface screens created by a Visual Thesaurus program formed in accordance with the present invention operating in conjunction with a multimedia applications program, such as CLIP GALLERY that works with a catalogue of clips. All of the screens (FIGS. 2A-2G) appear on the user's monitor 47 (FIG. 1). As previously discussed, the Visual Thesaurus formed in accordance with the present invention is an extension of a multimedia applications program such as CLIP GALLERY. Clips retrieved from the clip catalogue associated with the multimedia program in response to a user action are displayed in a clip display window 64 included in a display on the screen 60 of the user's monitor 47. More specifically, a small representation of the clip, known as a thumbnail, is actually displayed in the clip display window 64. For pictures, the thumbnail is a small version of the picture. For audio clips, the thumbnail is a picture representing the contents or format of the audio clip. For video clips, the thumbnail is generally the first frame of the video. For text, the thumbnail is a document icon, preferably containing an indication of the document contents. In this regard, preferably the multimedia application program has the capability of sorting clips based on media type (e.g., audio, video, picture, text). An indication of the media type 62 of the clips displayed in the clip display window 64 is displayed on the screen 60. An indication of the number of clips 66 displayed in the clip display window 64 is also displayed on the screen 60. A scrollbar 68 is provided to scroll through the clips displayed in the clip display window 64. In an actual embodiment of the present invention, an indication of the retrieval criteria is also displayed along with the number of clips 66. For example, FIG. 2A indicates that the clip display window 64 contains sixty (60) thumbnails of picture clips retrieved from the animal category.

After invoking a multimedia application program, the user selects a clip thumbnail 70 from the clips displayed in the clip display window 64 as an example of the type of clip the user is seeking. In an actual embodiment of the present invention, the user selects a clip thumbnail by moving the cursor over the desired clip thumbnail and pressing the primary (generally, the left) button of a pointing device 42 (FIG. 1). In the example illustrated in FIG. 2A the selected clip thumbnail 70 is a picture of a shark. While for ease of illustration and description, the examples shown in FIGS. 2A-2G and described below are all based on the selection of a single selected clip thumbnail, it is to be understood that multiple clip thumbnails may be selected.

After designating the selected clip thumbnail 70, the user invokes the Visual Thesaurus. In an actual embodiment of the present invention, the Visual Thesaurus is invoked by designating a selected clip. Upon invocation, a Visual Thesaurus user interface formed in accordance with the present invention is displayed. The Visual Thesaurus user interface 72 shown in FIG. 2A includes an indicator 74 (i.e., a pointer) that points to the selected clip thumbnail 70. All of the Visual Thesaurus functions are directed to the clip represented by the selected clip thumbnail 70. The Visual Thesaurus user interface also includes four buttons (76, 78, 80, and 82). The Visual Thesaurus functions are invoked by "pressing" the buttons contained in the Visual Thesaurus user interface 72, i.e., by placing a cursor pointer over the button and activating the appropriate key or button of the pointing device 42, or by entering an appropriate key or key sequence on the keyboard 40. The functions provided by the Visual Thesaurus include an insert function that is invoked when the user presses an insert button 76. The insert function causes the selected clip to be inserted into the document (e.g., Microsoft WORD document) that invoked the multimedia applications program. A play/preview function is invoked by pressing a play/preview button 78. The play/preview function causes a more comprehensive viewing of the clip. If the clip is a picture clip, an actual size version of the picture is shown on the display 47. If the clip is an audio clip, the audio is played. If the clip is a video clip, the video clip is shown on the display 47. If the clip is a text clip, the text is shown on the display 47. An add to category function is invoked by an add to category button 80. The add to category function causes an add to category user interface to be displayed. The add to category user interface provides a mechanism for the user to add the selected clip(s) to any of the existing categories, including a "Favorites" category. A find similar clips function is invoked by a find similar clips button 82.

Figure 2A:
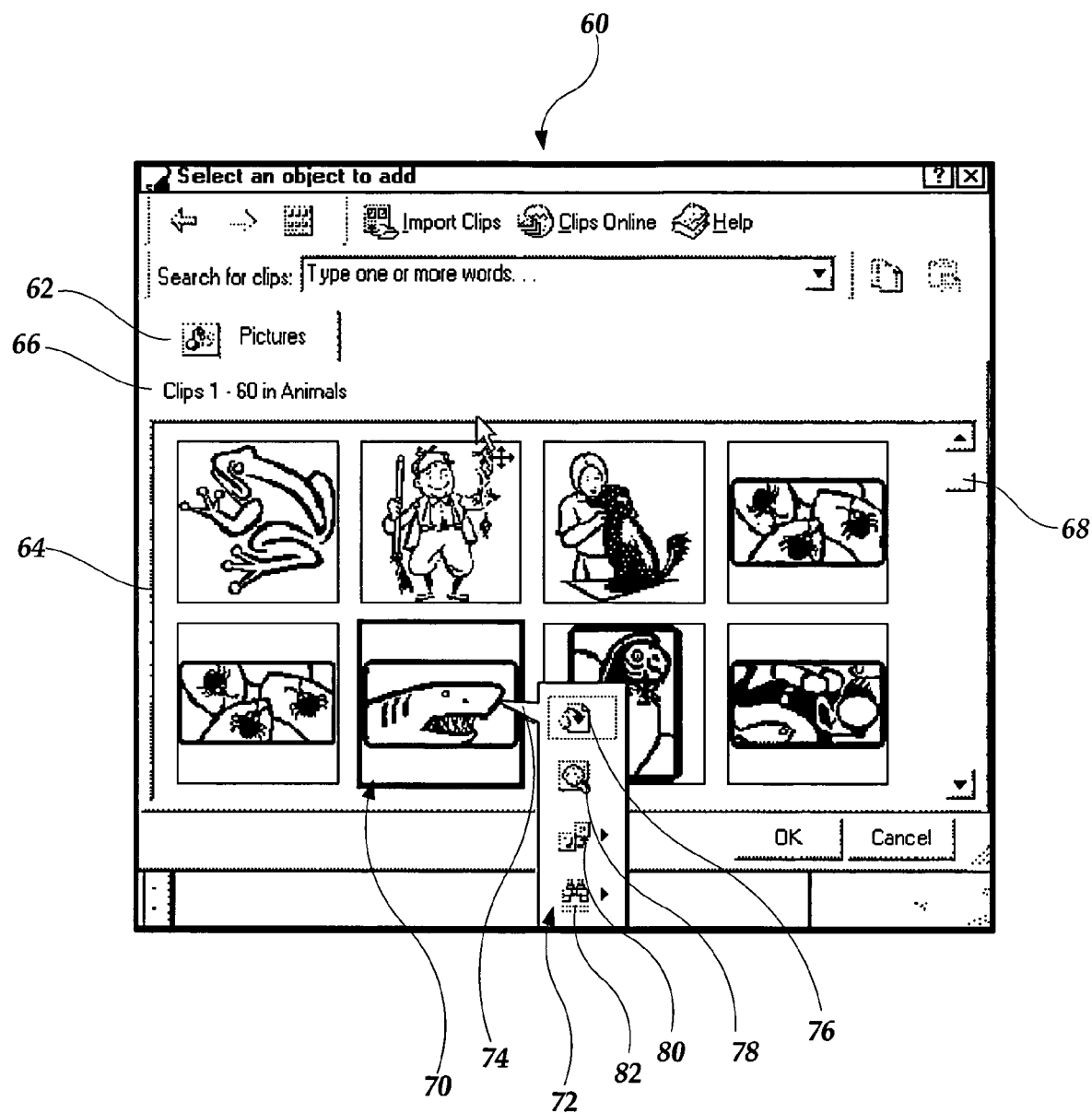
FIG. 2A is an example of a Visual Thesaurus user interface formed in accordance with the present invention.
Figure 2B:
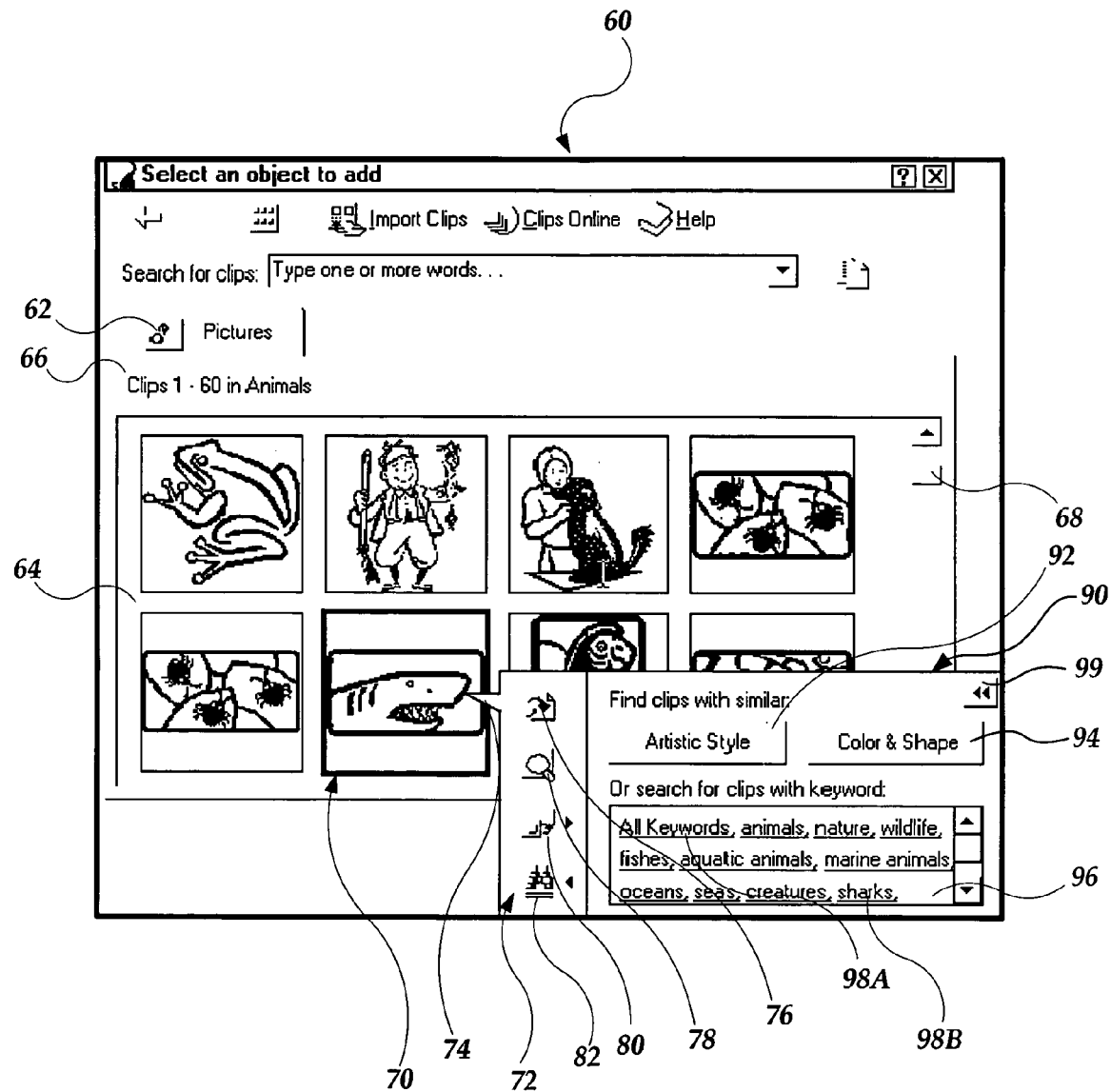
FIGS. 2B and 2C are examples of a Find Similar Clips user interface formed in accordance with the present invention.
Figure 2C:
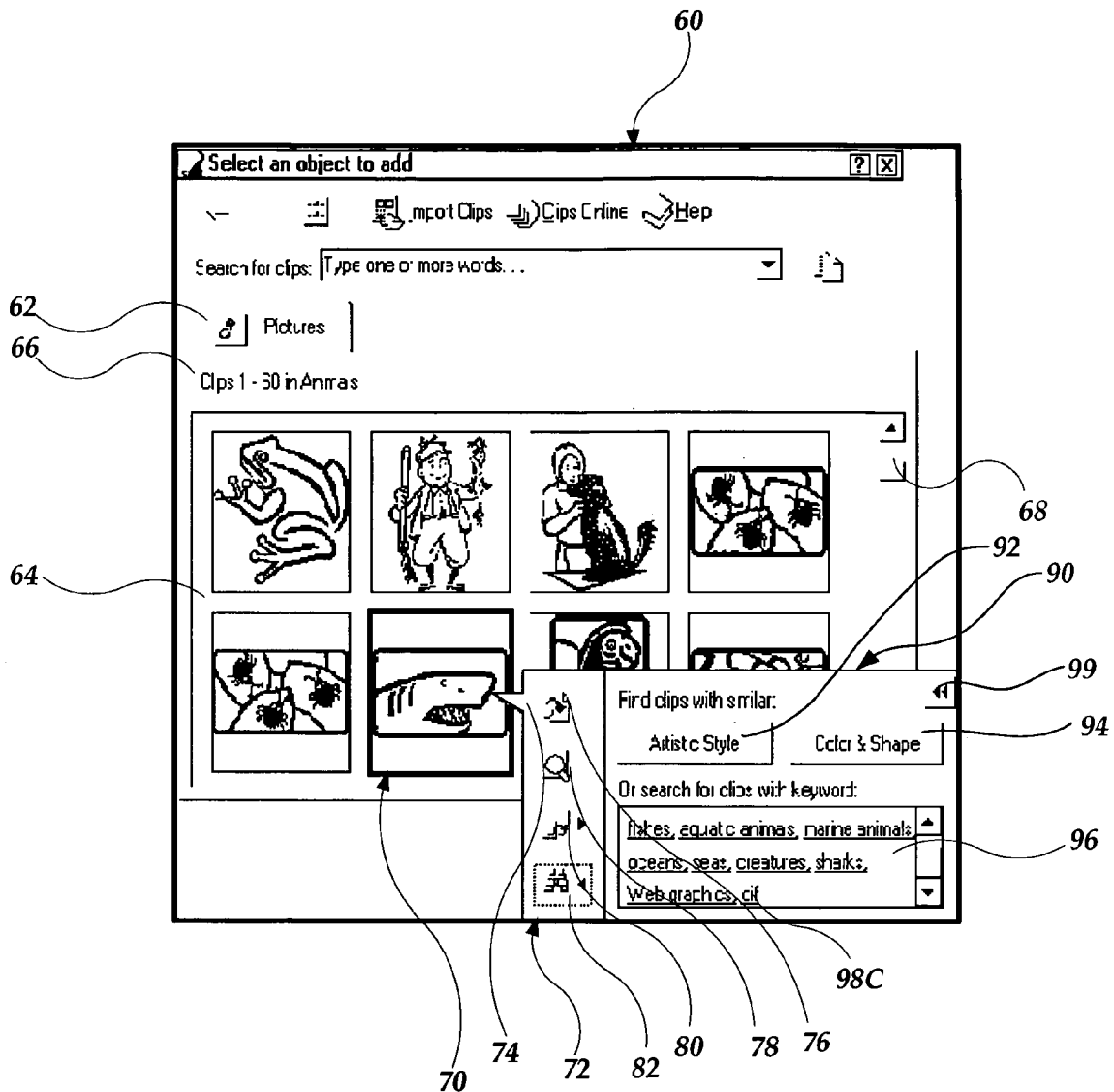

FIGS. 2B-2G illustrate an example of a series of views that might occur when the find similar clips function is invoked by pressing the find similar clips button 82. Upon pressing the find similar clips button, a find similar clips user interface 90 (FIG. 2B) is displayed. In an actual embodiment of the present invention, as illustrated in FIG. 2B, the find similar clips user interface 90 is a "fly-out" window, or an extension to the Visual Thesaurus user interface 72.

The find similar clips user interface 90 includes a method for invoking a find clips with similar artistic style function. The find clips with similar artistic style function is invoked by "pressing" an artistic style button 92. The find similar clips user interface 90 also includes a method for invoking a find clips with similar color and shape function. The find clips with similar color and shape function is invoked by "pressing" a color and shape button 94. The find similar clips user interface 90 also includes a list box 96 that includes all of the keywords associated with the selected clip, represented by the clip thumbnail 70. All of the keywords associated with the selected clip follow an "All Keywords" option 98A included in the keywords list box 96. One of the keywords 98C (the last keyword in the example shown in FIG. 2C, which is the same as FIG. 2B, except that the user has scrolled to the bottom of the keyword list box 96) identifies the type of media of the selected clip, "gif" for example. The user may find similar clips based on all keywords or a single keyword.

The find similar clips user interface 90 also includes a method for closing the find similar clips user interface. In an embodiment of the invention shown in FIG. 2B, the method for closing the find similar clips user interface is invoked by "pressing" a button 99 containing a chevron. Pressing this button causes the find similar clips user interface to be removed from the display, resulting in the display returning to the Visual Thesaurus user interface as shown in FIG. 2A.

As will be readily appreciated from the foregoing description and viewing FIG. 2B, the user interface of the present invention employs techniques, such as the use of buttons and a "fly-out" window that are designed to minimize the amount of display real estate taken up by the user interface.

Figure 2D:
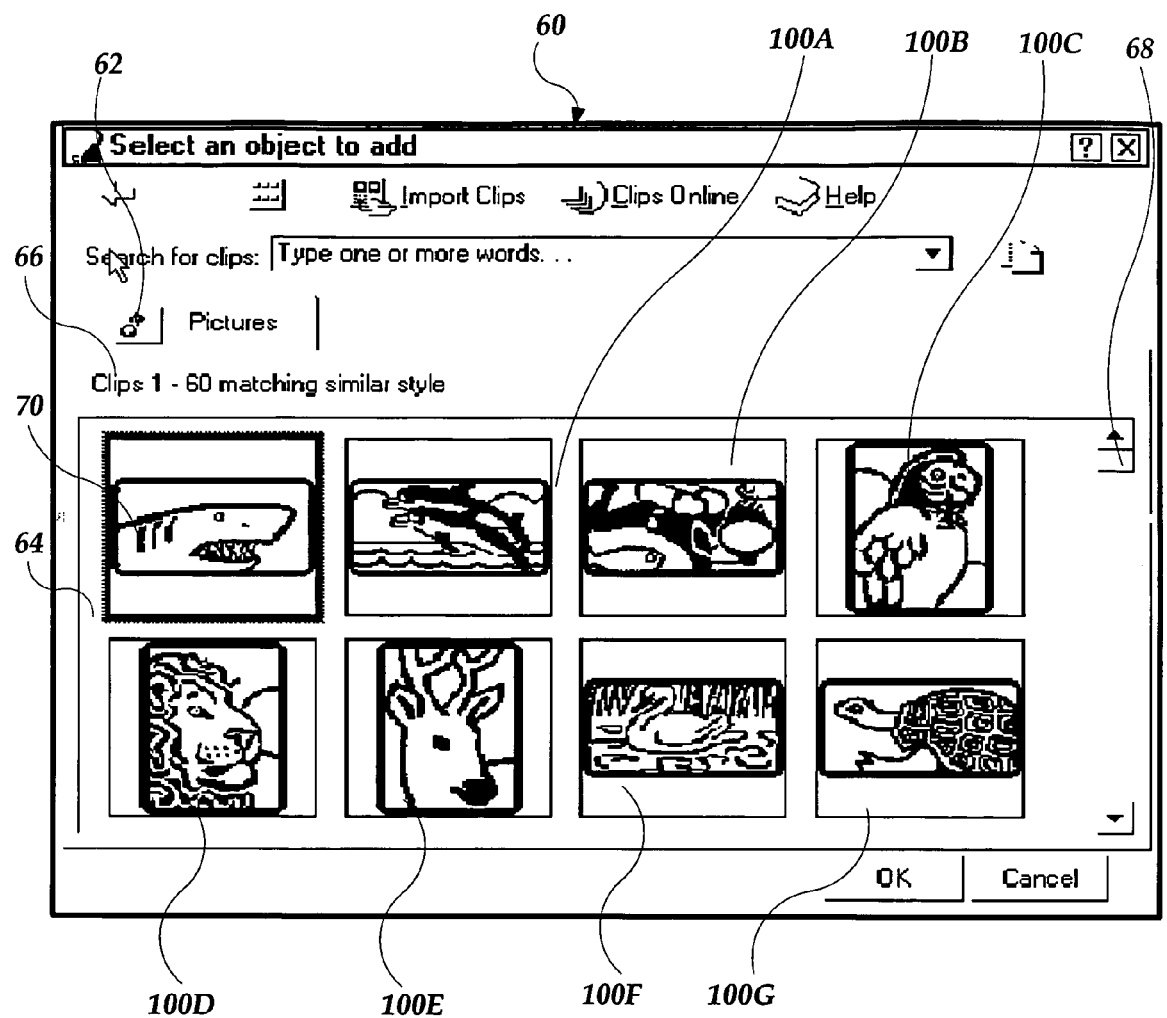
FIG. 2D is an example display that is the result of performing a find clips with similar artistic style search in accordance with the present invention.

When the user invokes the find clips with similar artistic style function by "pressing" the artistic style button 92, a display of the type illustrated in FIG. 2D appears (for the selected clip 70). As shown in FIG. 2D, the clip thumbnails displayed in the clip window 64 change to clips 100A-100G chosen from the clip catalogue associated with the multimedia applications program that have an artistic style similar to the artistic style of the selected clip. Further, the selected clip thumbnail 70 becomes the first clip thumbnail displayed in the clip window 64. In an actual embodiment of the present invention, artistic style is a single hidden keyword. The artistic style keyword is stored in the clip catalogue when the clip is added to the catalogue. In this embodiment of the invention, an artistic style keyword cannot be added to a clip by a user. Further, a user cannot modify or change the artistic style keyword given to a clip. In this embodiment of the invention, it is possible that a given clip has no artistic style keyword. In this embodiment of the invention, the show clips of similar artistic style function is disabled when the selected clip has no assigned artistic style keyword. Thus, a user is not able to invoke the show clips of similar artistic style function if the selected clip has no artistic style keyword. After similar clips have been displayed, the user can perform additional functions on the same clip by selecting the same clip thumbnail 70 again, or on a different clip (100A-100G) by selecting the different clip thumbnail. As described above, a clip is selected by placing a cursor over the clip thumbnail and activating a pointing device button, or by pressing an appropriate key or key sequence on the keyboard. When this occurs, the Visual Thesaurus user interface 72 opens.

Figure 2E:
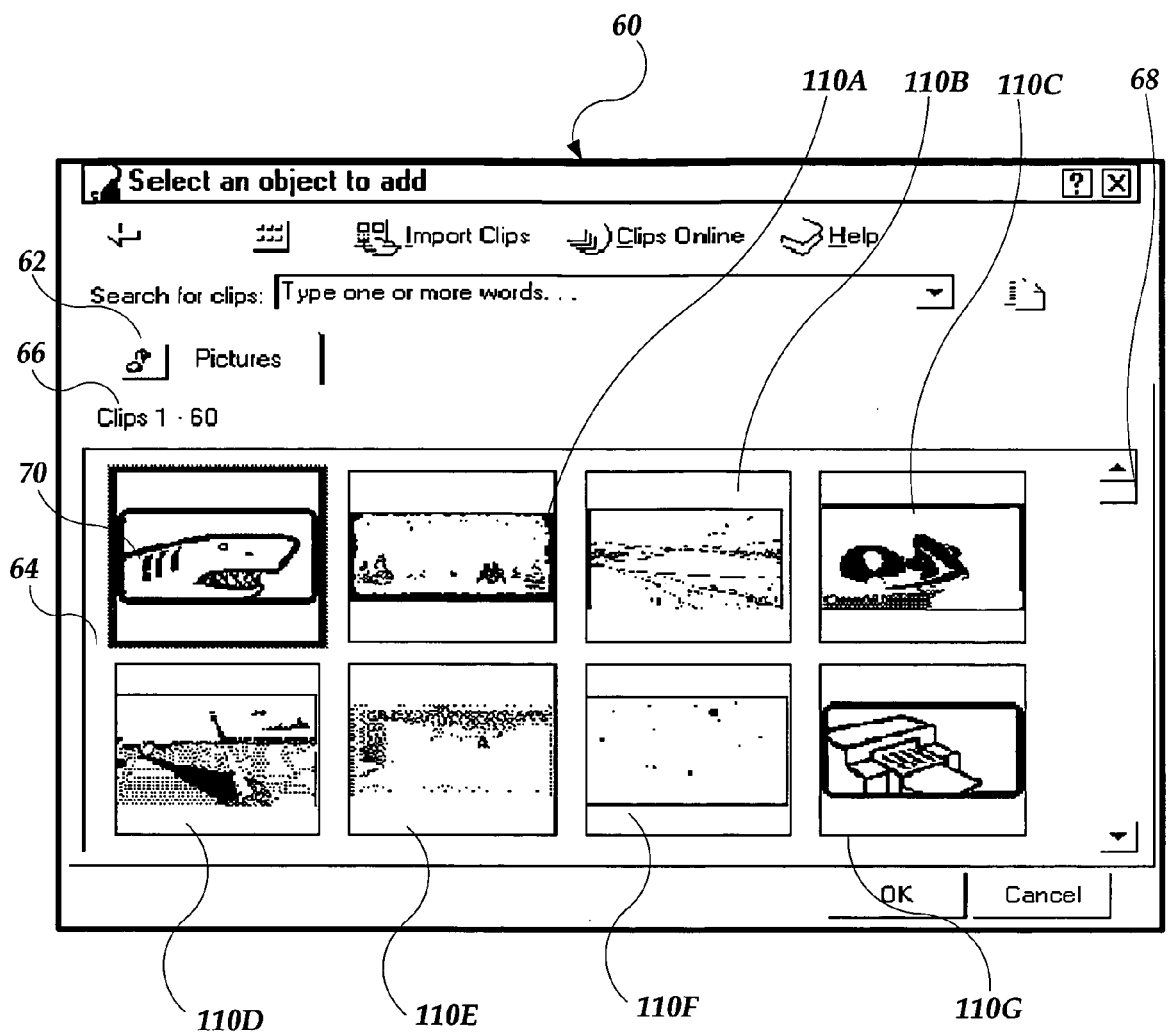
FIG. 2E is an example display that is the result of performing a find clips with similar color and shape search in accordance with the present invention.

FIG. 2E is an example illustrating a display resulting from the user selecting the find clips of similar color and shape function by pressing the color and shape button 94 (FIG. 2B). When the color and shape button is pressed, clips 110A-110G having a color and shape similar to the selected clip (i.e., the shark clip thumbnail 70 in this example) are displayed in the clip display window 64, with the selected clip thumbnail 70 being the first clip thumbnail displayed in the clip display window.

Figure 2F:
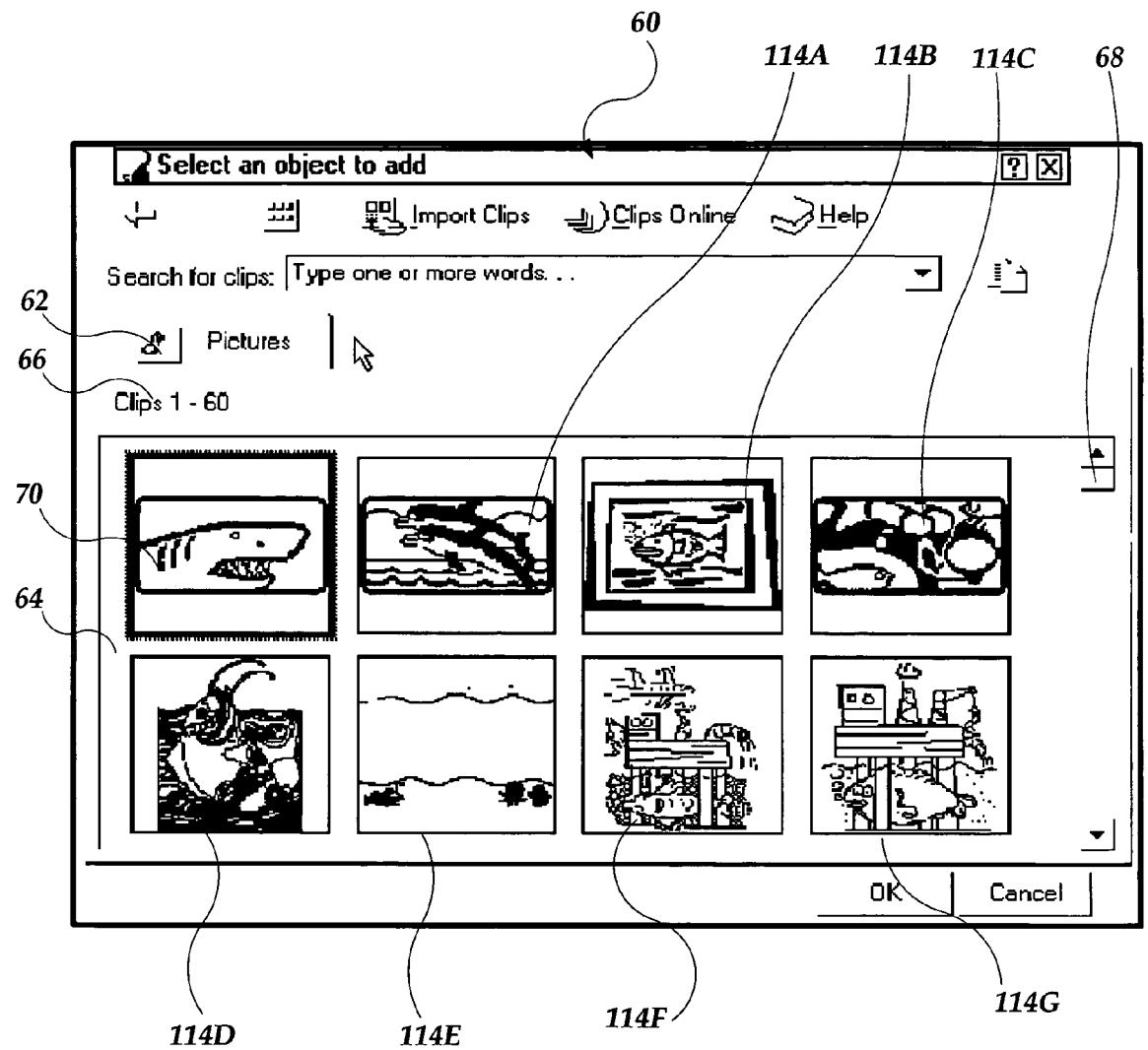
FIG. 2F is an example display that is the result of performing a find clips that match any keyword (i.e., all keywords) search in accordance with the present invention.

FIG. 2F is an example illustrating a display resulting from the user selecting All Keywords 98A from the keywords contained in the list box 96 (FIG. 2B). If the user selects All Keywords, clips whose keyword list contains at least one of the keywords associated with the selected clip are retrieved. The retrieved clips 114A-114G are displayed in the clip display window 64, again with the selected clip thumbnail 70 being the first clip thumbnail displayed.

Figure 2G:
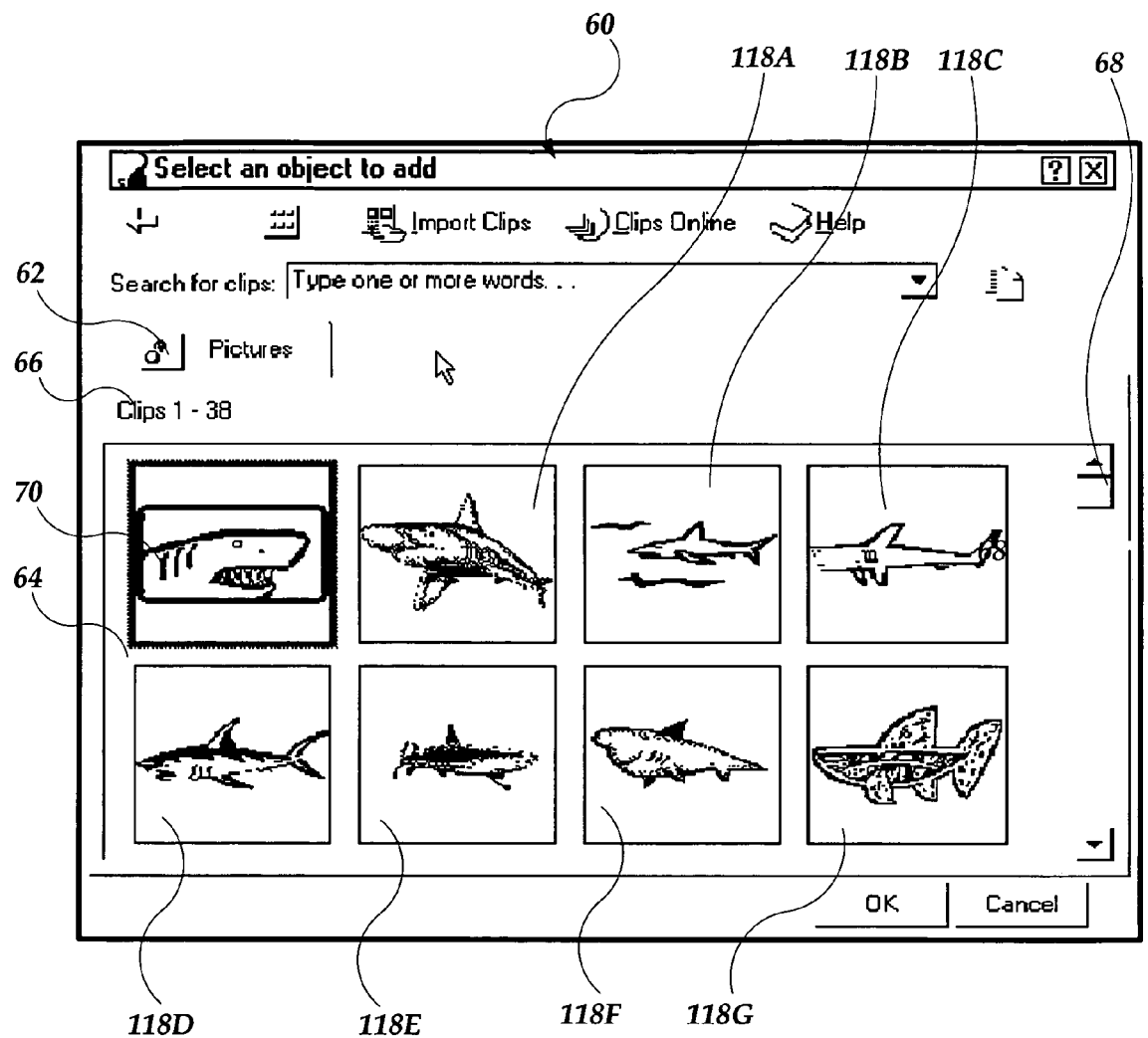
FIG. 2G is an example display that is the result of performing a find clips matching a specific keyword search in accordance with the present invention.

FIG. 2G is an example illustrating a display resulting from the user selecting one of the keywords. In this example, the keyword selected is "sharks" 98B (FIG. 2B). All of the clip thumbnails 118A-118G whose keyword list contains the keyword "sharks" are retrieved and displayed in the clip display window 64, again with the selected clip thumbnail 70 being the first clip thumbnail displayed.

Figure 3:
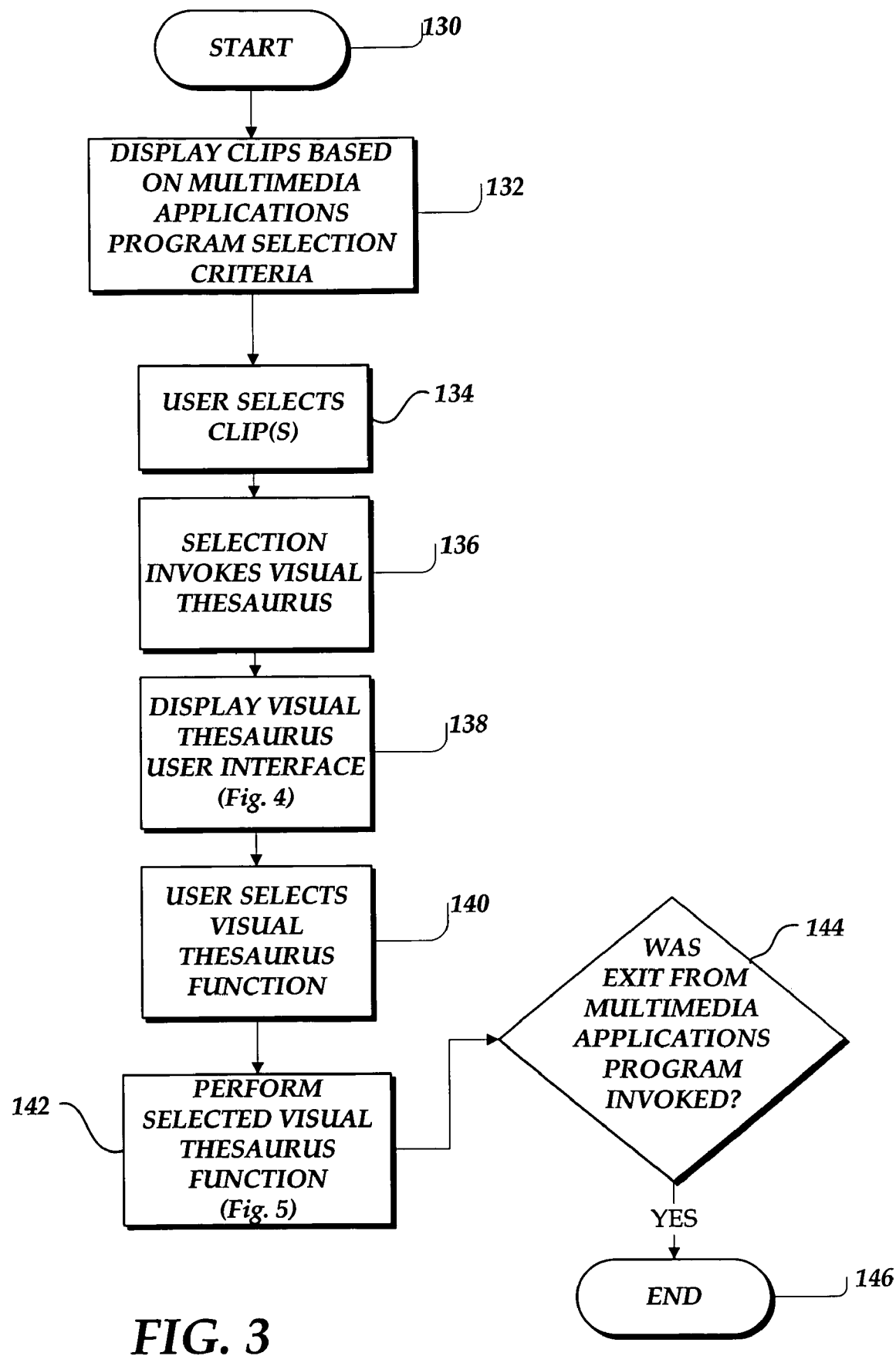
FIG. 3 is a flow diagram illustrating the overall logic of a Visual Thesaurus program formed in accordance with the present invention.

FIG. 3 is a flow diagram illustrating the overall logic of a Visual Thesaurus program formed in accordance with the present invention. The logic in FIG. 3 begins in a block 130 and proceeds to a block 132 where clips are displayed by a multimedia applications program, such as CLIP GALLERY, based on some criteria that does not form part of this invention. For example, the clips may be chosen based on media type. In this regard, the clips shown in FIG. 2A are picture clips. Alternatively, clips can be chosen based on one or more categories. As well known to those familiar with CLIP GALLERY, sorting by categories provides the user with a useful mechanism for navigating through a series of clips. For example, the clips displayed in FIG. 2A are the picture clips found under an "animal" category.

Returning to FIG. 3, the user selects one or more of the displayed clips. See block 134. At block 136, after one or more clips have been selected, the Visual Thesaurus formed is invoked. In an actual embodiment of the present invention, the Visual Thesaurus is automatically invoked by the selection of a clip. More specifically, in this embodiment of the invention, a pointing device 42 is used to position a cursor over the desired clip thumbnail. The Visual Thesaurus is invoked for the selected clip by pressing a button or key on the pointing device. As with all other applications running under the Windows operating system that supports a multiple select function, such as Windows Explorer, multiple clips are preferably selected by using the pointing device 42 to position a cursor outside (i.e., not on) the first clip thumbnail, pressing the appropriate pointing device key or button and, while holding the key or button down, dragging the cursor across the other objects (i.e., clip thumbnails) to be selected, then releasing the button. Also, as with other applications that run under the Windows operating system, preferably, a user can select and hold the Shift key of a keyboard 40 before selecting to enable a range of selections or operate the Ctrl key to toggle selecting/deselecting individual items in a range.

Upon invocation, at a block 138, the Visual Thesaurus user interface is displayed. An example of an actual embodiment of a Visual Thesaurus user interface formed in accordance with the present invention is illustrated in FIG. 2A. As described above, in this actual embodiment of the invention, the Visual Thesaurus has four main functions. These functions are invoked by pressing buttons included in the Visual Thesaurus user interface. As described above, these functions are: (i) insert a clip; (ii) play/preview a clip; (iii) add clip to a category, and (iv) find similar clips.

Figure 4:
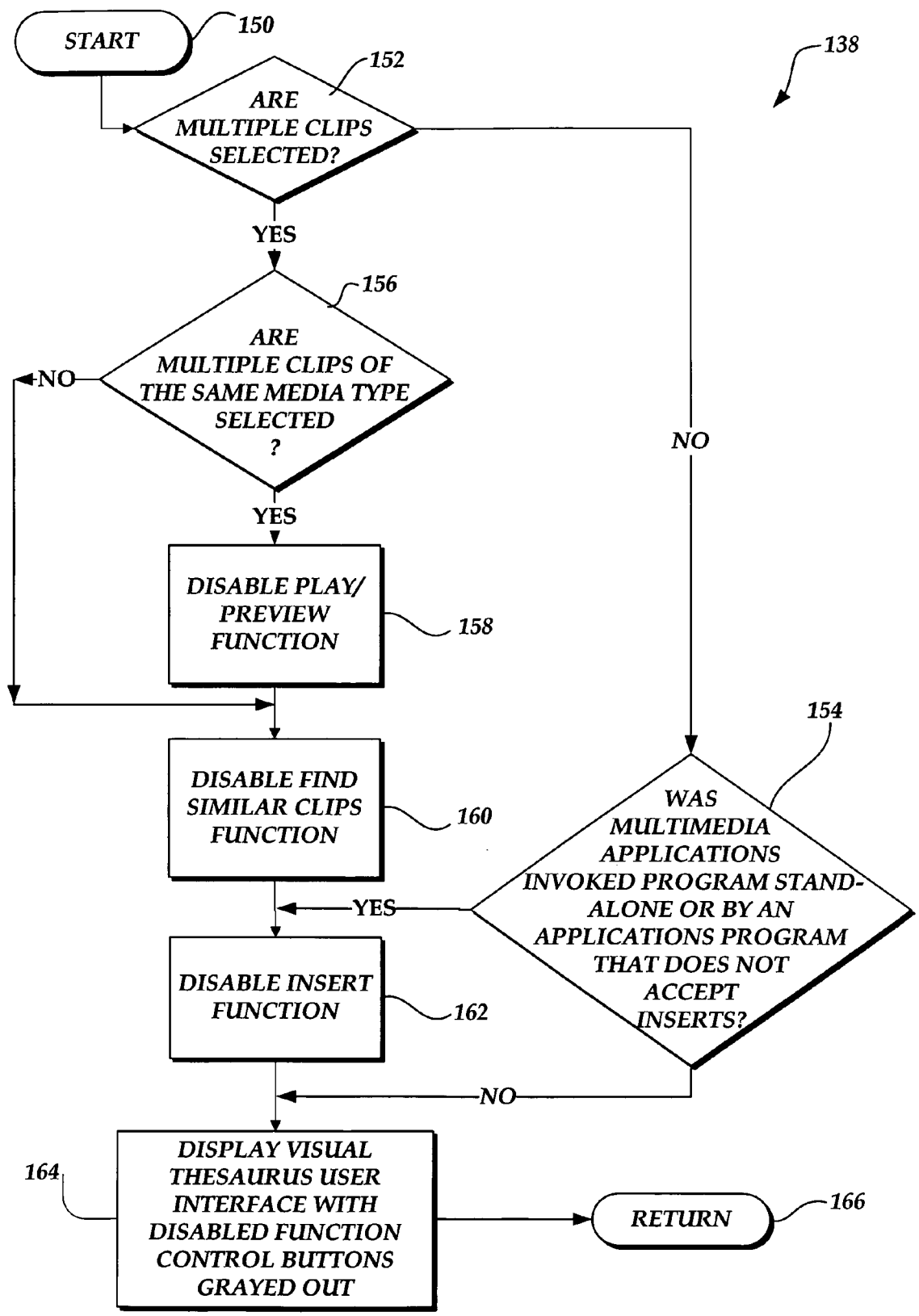
FIG. 4 is a flow diagram illustrating display Visual Thesaurus user interface logic suitable for use in the Visual Thesaurus program illustrated in FIG. 3.

FIG. 4 illustrates in detail the display Visual Thesaurus user interface logic (block 138, FIG. 3). The FIG. 4 logic begins in a block 150 and proceeds to a decision block 152 where a test is made to determine if multiple clips are selected. If in decision block 152 it is determined that multiple clips are selected, the logic proceeds to a decision block 156 where a test is made to determine if multiple clips of the same media type are selected (i.e., multiple audio clips, multiple video clips, etc.). If in decision block 156 it is determined that multiple clips of the same media type are selected, the logic proceeds to a block 158 where the play/preview function is disabled. In an actual embodiment of the present invention shown in FIG. 2A, each of the four main functions is invoked by a button. In a conventional manner, a function is indicated as disabled by graying-out the appropriate button. After the play/preview function is disabled, or if, in decision block 156 it was determined that even though there are multiple clips selected (yes in decision block 152), each of the selected clips is a different media type, whereby the play/preview option is not disabled, at a block 160, the find similar clips function is disabled. Thereafter, at a block 162, the insert function is disabled.

If in decision block 152 it is determined that multiple clips are not selected (i.e., only one clip selected), the logic proceeds to a decision block 154 where a test is made to determine if the multimedia applications program, e.g., CLIP GALLERY, was invoked stand-alone or by an application program that does not accept inserts. If in decision block 154 it is determined that the multimedia applications program was invoked stand-alone or by an application program that does not accept inserts, the logic proceeds to block 162 where the insert function is disabled. In this case, the play/preview and the find similar clips functions are not disabled. If in decision block 154 it is determined that the multimedia applications program was not invoked stand-alone or by an application program that does not accept inserts (i.e., the multimedia applications program was invoked by another application program that does accept inserts), none of the Visual Thesaurus functions are disabled. In other words, all Visual Thesaurus functions are available if the multimedia applications program was invoked by another application program that accepts inserts, and one clip is selected. If the multimedia applications program was invoked stand-alone, or by an application program that does not accept inserts and one clip was selected, all Visual Thesaurus functions are enabled except for the insert function. Regardless of whether the multimedia applications program is invoked by another application program or stand-alone, if multiple clips are selected, the find similar clips and insert functions are disabled. If more than one clip within a media type is selected (e.g., more than one audio clip), the play/preview function is disabled, as well as the find similar clips and insert functions. After the appropriate functions, if any, have been disabled, the logic proceeds to a block 164 where the Visual Thesaurus user interface is displayed with the control buttons associated with the disabled functions grayed out. The display Visual Thesaurus user interface logic then ends in a block 166.

Returning to FIG. 3, after the Visual Thesaurus user interface has been displayed (block 138), the user may select any of the available Visual Thesaurus functions. See block 140. After a Visual Thesaurus function has been selected, the logic proceeds to a block 142 where the selected Visual Thesaurus function is performed. Suitable perform selected Visual Thesaurus function logic is illustrated in detail in FIG. 5 and described next.

Figure 5:
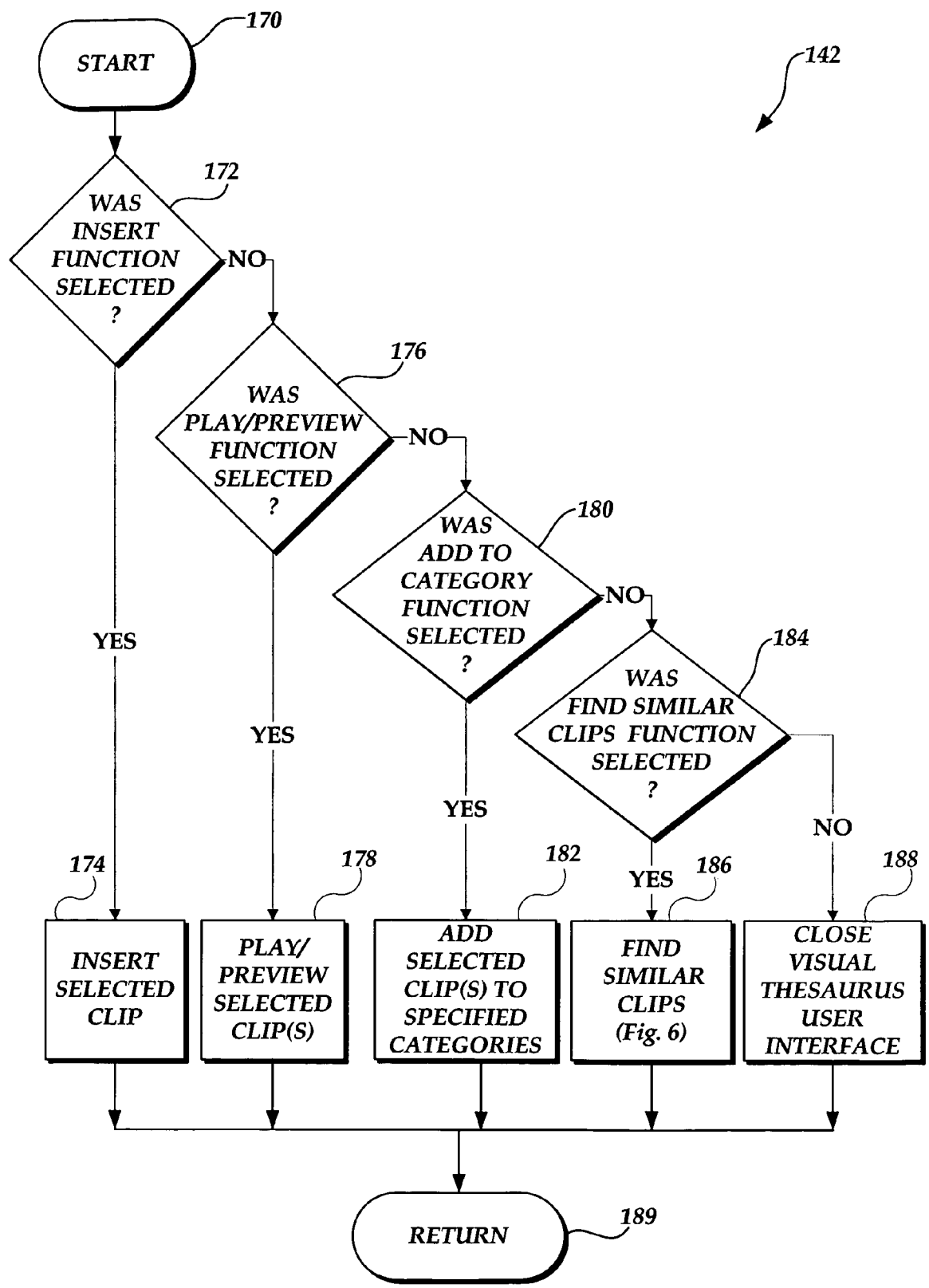
FIG. 5 is a flow diagram illustrating perform selected Visual Thesaurus function logic suitable for use in the Visual Thesaurus program illustrated in FIG. 3.

FIG. 5 begins in a block 170 and proceeds to a decision block 172 where a test is made to determine if the insert function was selected. If in decision block 172 it is determined that the insert function was selected, the logic proceeds to a block 174 where the selected clip is inserted. For example, if the multimedia applications program was invoked by a word processing program, the selected clip is inserted into the document being worked on by the word processing program at the location of the cursor. In an actual embodiment of the present invention, upon selection of insert, the application program that invoked the multimedia application program determines whether the multimedia applications program exits after performing an insert function.

If in decision block 172 it is determined that the insert function was not selected, the logic proceeds to a decision block 176 where a test is made to determine if the play/preview function was selected. If in decision block 176 it is determined that the play/preview function was selected, the logic proceeds to a block 178 where the selected clip(s) are played/previewed. If the clip is graphical in nature, an actual size version of the clip is displayed. If the clip is a video clip, the video is played. If the clip is an audio clip, the audio is played. As discussed above, although multiple clips can be played/previewed, only one clip may be played/previewed for any media type. In other words, a video clip and an audio clip can be played/previewed simultaneously, but two audio clips can not be played/previewed simultaneously.

If in decision block 176 it is determined that the play/preview function was not selected, the logic proceeds to a decision block 180 where a test is made to determine if the add to category function was selected. If in decision block 180 it is determined that the add to category function was selected, the logic proceeds to a block 182 where the clip(s) is added to a specified category or categories. In an actual embodiment of the present invention, the user is presented with a list of available categories. The user can add the selected clip(s) to whichever categories he or she chooses, or enter a new category name to which the clip is then added.

If in decision block 180 it is determined that the add to category function was not selected, the logic proceeds to a decision block 184 where a test is made to determine if the find similar clips function was selected. If the find similar clips function was selected, the logic proceeds to a block 186 where the find similar clips function is performed.

Figure 6:
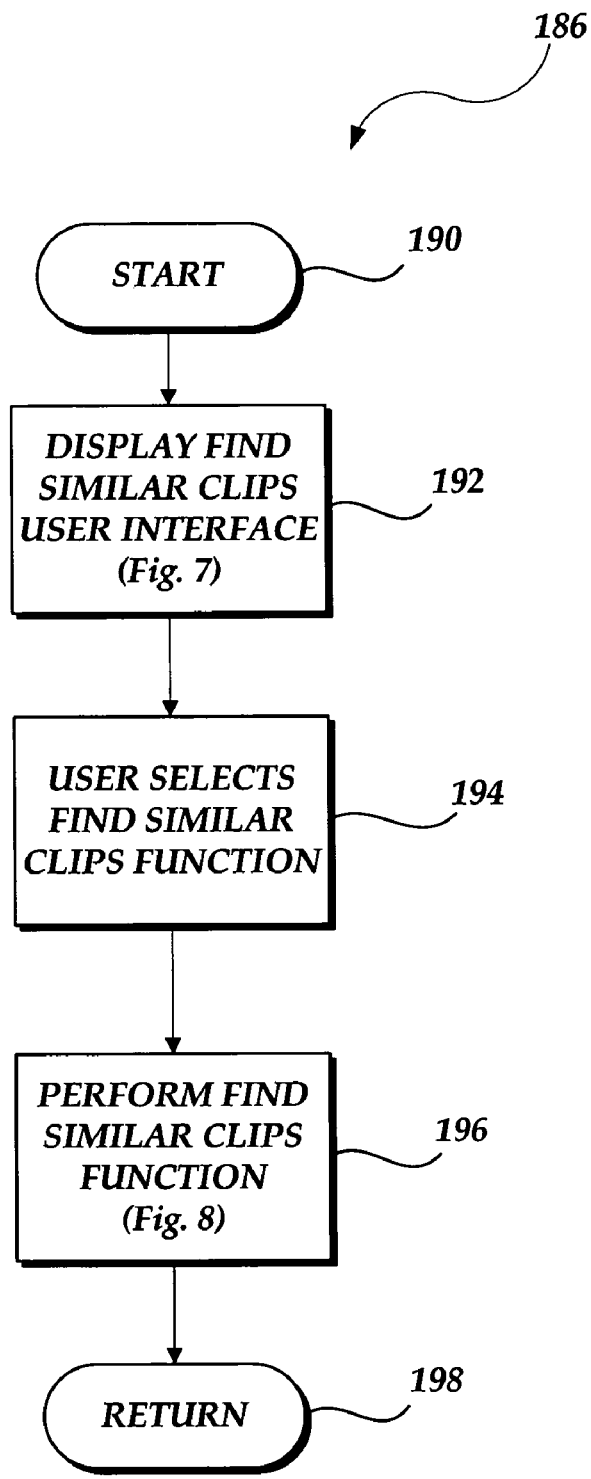
FIG. 6 is a flow diagram illustrating find similar clips logic suitable for use in the perform selected Visual Thesaurus function logic illustrated in FIG. 5.
Figure 7:
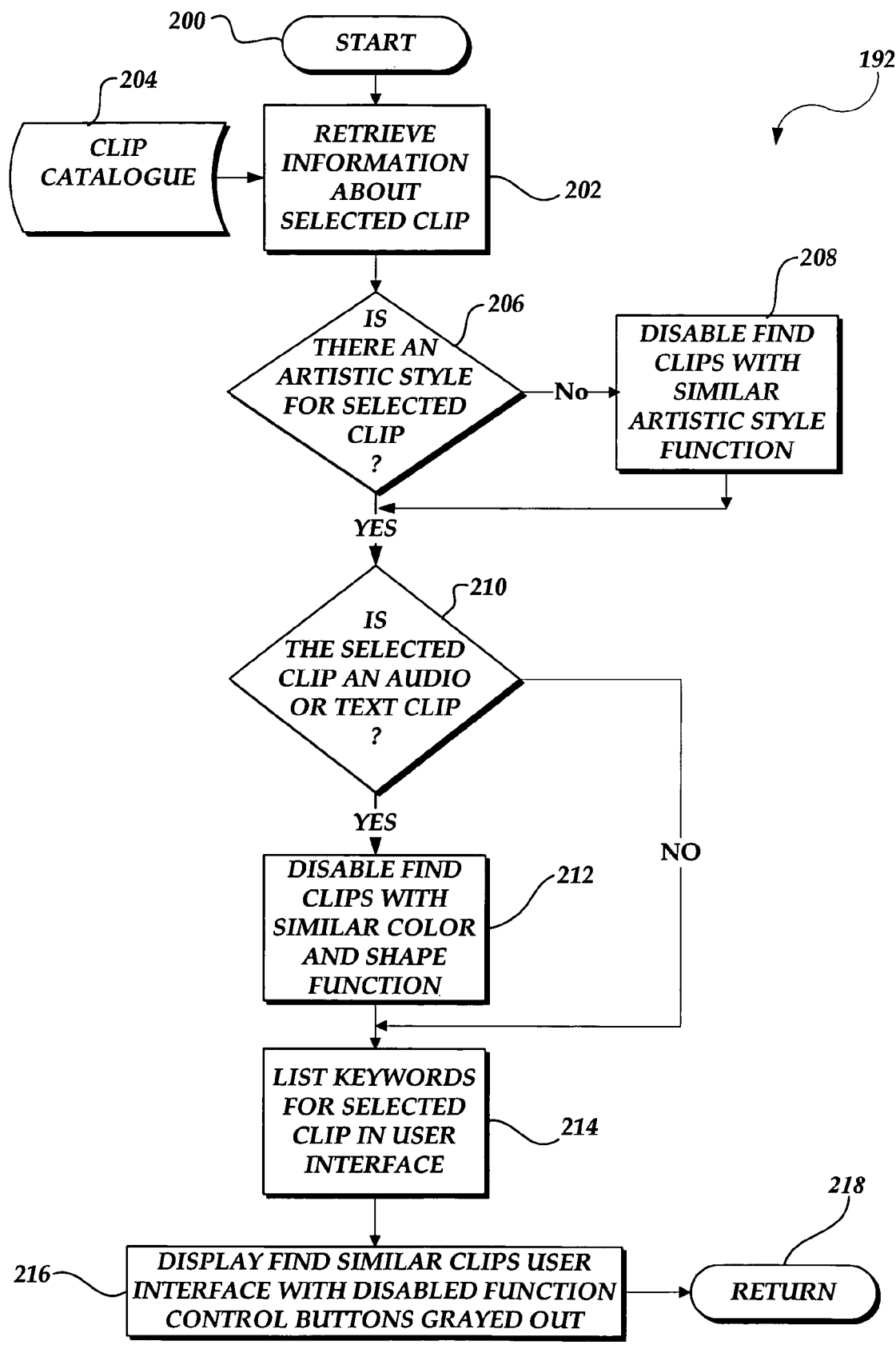
FIG. 7 is a flow diagram illustrating display find similar clips user interface logic suitable for use in the find similar clips logic illustrated in FIG. 6.

FIG. 6 illustrates find similar clips logic suitable for use in the perform selected Visual Thesaurus function logic illustrated in FIG. 5. As illustrated in FIG. 2B and described above, in an actual embodiment of the present invention, the find similar clips function allows a user to find similar clips based on any one of: (i) artistic style; (ii) color and shape; or (iii) keyword. The find similar clips logic shown in FIG. 6 begins in a block 190 and proceeds to a block 192 where the find similar clips user interface is displayed. Display find similar clips user interface logic suitable for use in the find similar clips logic is illustrated in FIG. 7. The display find similar clips user interface logic shown in FIG. 7 begins in a block 200 and proceeds to a block 202 where information about the selected clip is retrieved from the clip catalogue 204 associated with the multimedia applications program that invoked the Visual Thesaurus program. In an actual embodiment of the present invention, the clip catalogue information includes an identification (name) for each clip, the location of the clip, an artistic style (if there is one) for the clip, a list of keywords associated with the clip, and a thumbnail (small sketch) for the clip. It will be appreciated that the clip catalogue can be implemented using any one of a variety of formats, such as a database, structured storage, or a spreadsheet.

After the available information about the selected clip is obtained from the clip catalogue, the logic proceeds to a decision block 206 where a test is made to determine if there is an artistic style associated with the selected clip i.e., if clip has an artistic style keyword. If in decision block 206 it is determined that the clip does not have an artistic style keyword, the find clips with similar artistic style function is disabled. See block 208. After the find clips with similar artistic style function has been disabled, if appropriate, the logic proceeds to a decision block 210 where a test is made to determine if the selected clip is an audio or text clip. If in decision block 210 it is determined that the selected clip is an audio or text clip, the logic proceeds to a block 212 where the find clips with similar color and shape function is disabled. After the find clips with similar color and shape function has been disabled, or if the selected clip is not an audio or text clip, the logic proceeds to a block 214 where all of the keywords associated with the selected clip are added to the user interface. The logic then proceeds to a block 216 where the find similar clips user interface is displayed with the disabled function control buttons grayed out and all of the keywords associated with the selected clip displayed. See FIG. 2B and the foregoing description. The find similar clips user interface logic then ends in a block 218.

Figure 8:
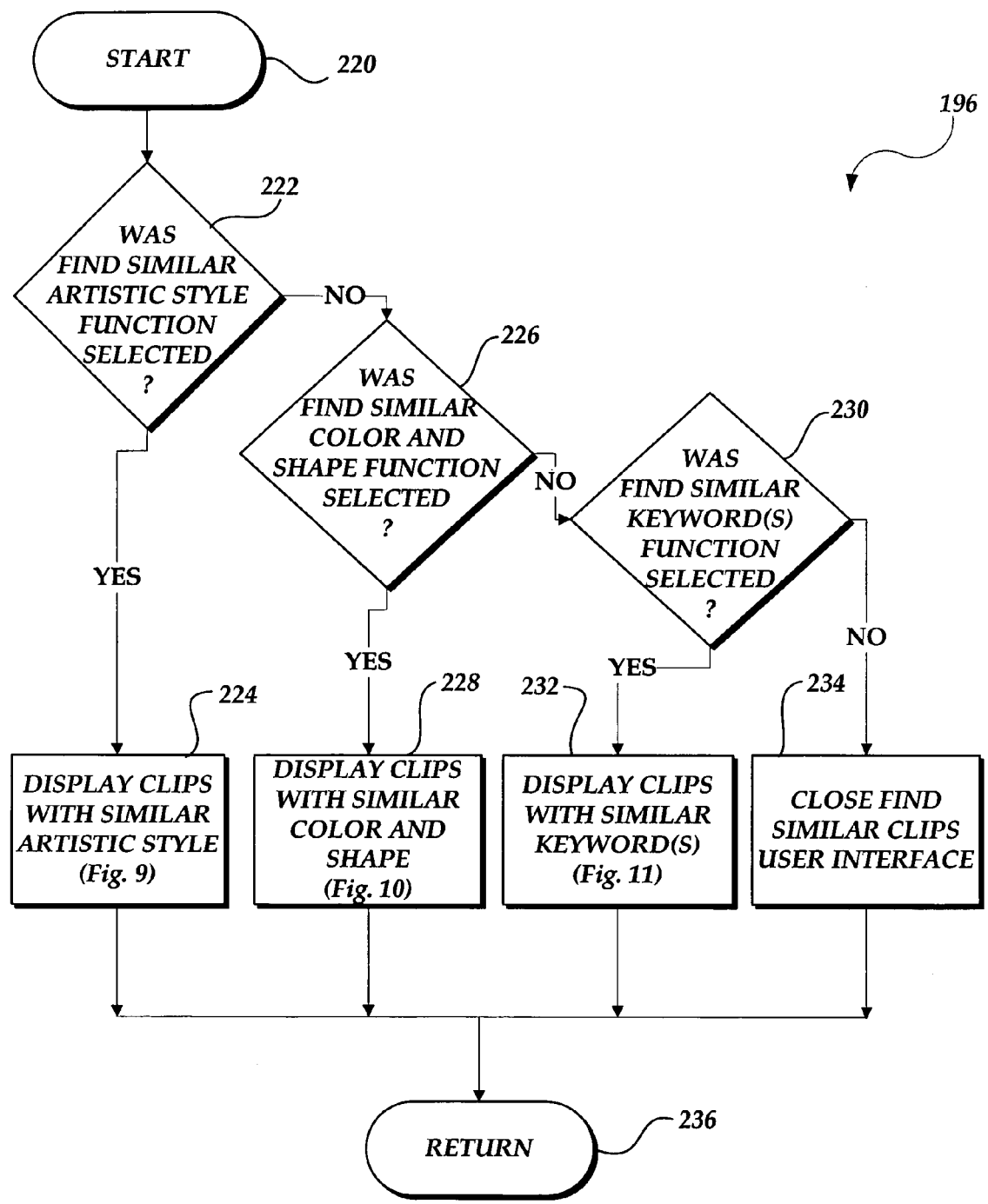
FIG. 8 is a flow diagram illustrating perform find similar clips function logic suitable for use in the find similar clips logic illustrated in FIG. 6.

Returning to FIG. 6, after the find similar clips user interface has been displayed (block 192), the logic proceeds to a block 194 where the user selects one of the available find similar clips functions. After the user has selected one of the available find similar clips functions, the logic proceeds to a block 196 where the selected function is performed. FIG. 8 illustrates perform find similar clips function logic suitable for use in the find similar clips logic illustrated in FIG. 6 in accordance with the present invention.

The perform find similar clips function logic shown in FIG. 8 begins in a block 220 and proceeds to a decision block 222 where a test is made to determine if the find clips with similar artistic style function was selected. If in decision block 222 it is determined that the find clips with similar artistic style function was selected, the logic proceeds to a block 224 where clips with similar artistic style are displayed. Display clips with similar artistic style logic suitable for use in the perform find similar clips function logic (FIG. 8) is illustrated in FIG. 9.

Figure 9:
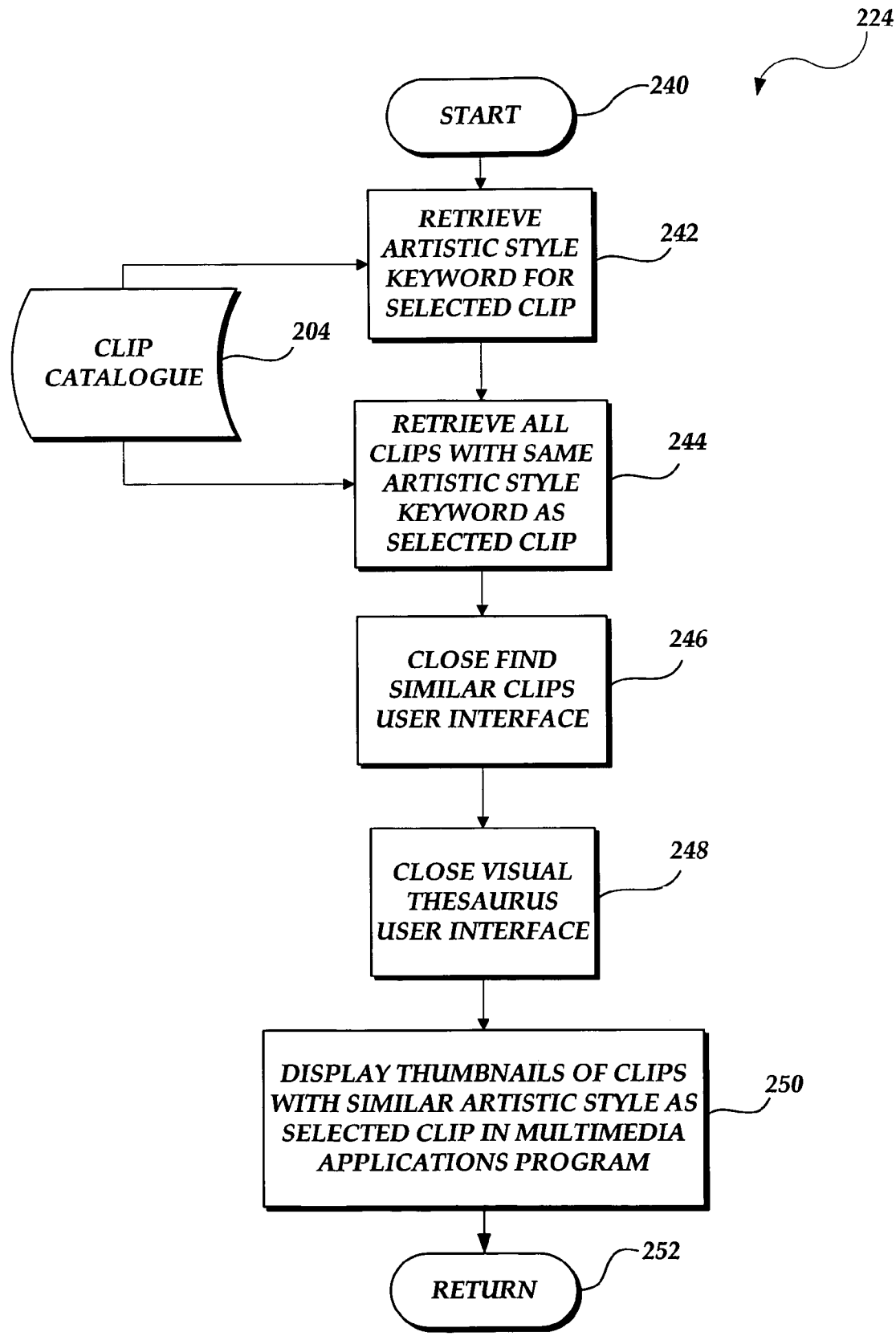
FIG. 9 is a flow diagram illustrating display clips with similar artistic style function logic suitable for use in the perform find similar clips logic illustrated in FIG. 8.

The display clips with similar artistic style logic shown in FIG. 9 begins in a block 240 and proceeds to a block 242 where the artistic style keyword for the selected clip is retrieved from the clip catalogue 204. As noted above, if a clip does not have an artistic style keyword associated with it, the option for finding clips with similar artistic style is disabled (FIG. 7, block 208). After the artistic style keyword for the selected clip has been retrieved, all of the clips in the clip catalogue 204 having artistic style keywords that match the artistic style keyword of the selected clip are retrieved. See block 244. As illustrated in FIG. 2D and described above, thereafter, the user is returned to the multimedia applications program that invoked the Visual Thesaurus program, which now displays all of the clips in the clip catalogue 204 having the same artistic style keyword as the selected clip thumbnail 70. This is accomplished by closing the find similar clips user interface (block 246) and closing the Visual Thesaurus user interface (block 248). After the Visual Thesaurus user interface is closed, the thumbnails of the clips (that were retrieved from the clip catalogue 204) that have an artistic style keyword that matches the artistic style keyword of the selected clip are displayed by the multimedia applications program 250. The logic for finding clips with similar artistic style then ends in a block 252.

Returning to FIG. 8, if in decision block 222 it is determined that find clips of similar artistic style function was not selected, the logic proceeds to a decision block 226 where a test is made to determine if the find clips of similar color and shape function was selected. If in decision block 226 it is determined that the find clips of similar color and shape function was selected, the logic proceeds to a block 228 where clips with color and shape similar to the color and shape of the selected clip are displayed. Display clips with similar color and shape logic suitable for use in the perform find similar clips function logic (FIG. 8) is illustrated in FIG. 10.

Figure 10:
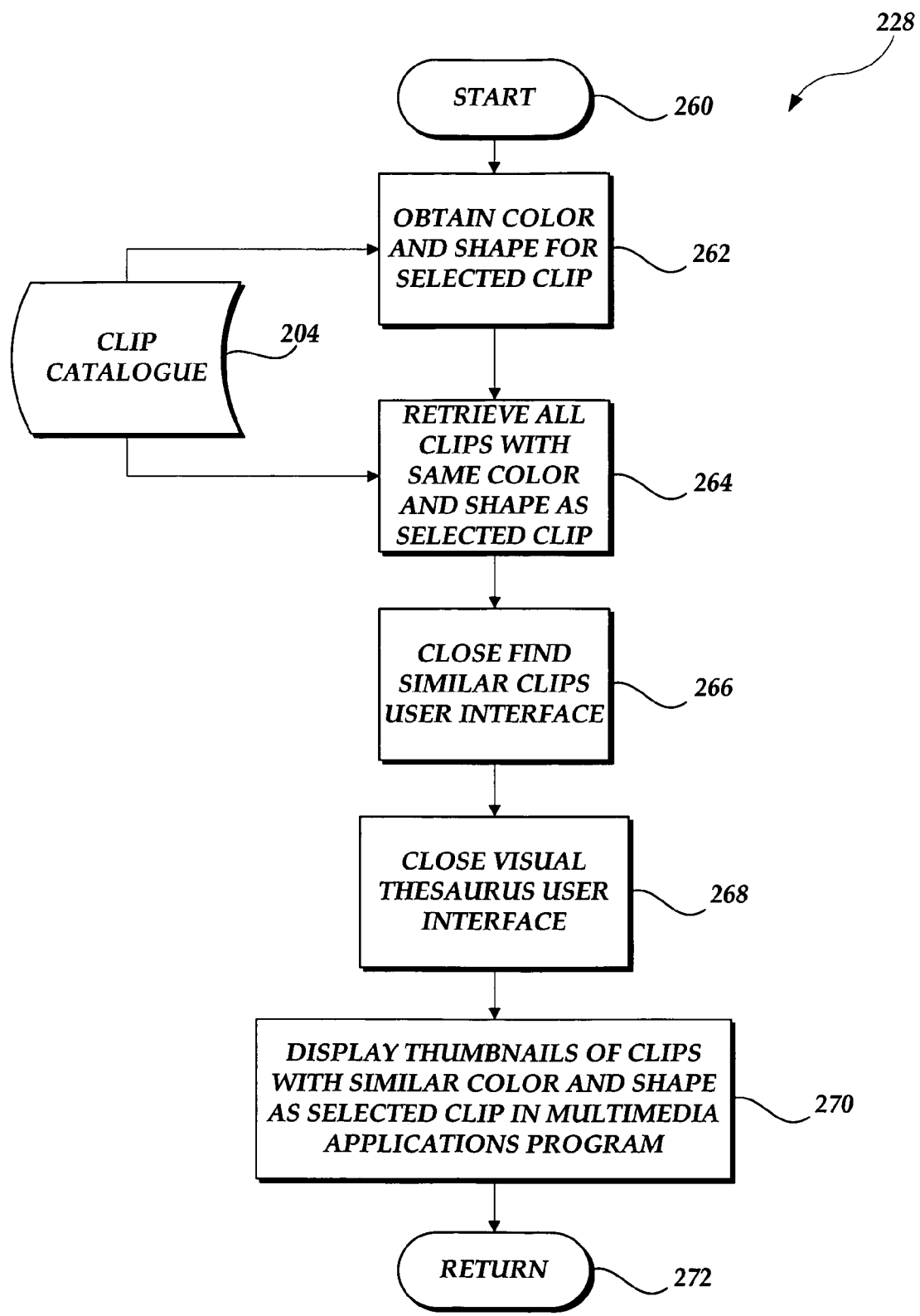
FIG. 10 is a flow diagram illustrating display clips with similar color and shape function logic suitable for use in the perform find similar clips logic illustrated in FIG. 8.

The display clips with similar color and shape logic shown in FIG. 10 begins in a block 260 and proceeds to a block 262 where keywords that define the color and shape of the selected clip are retrieved from the clip catalogue 204. Alternatively, mathematical representations that define the color and shape of the selected clip are retrieved from the clip catalogue 204. After information that describes the color and shape of the selected clip are retrieved from the clip catalogue, the logic proceeds to a block 264 where all of the clips in the clip catalogue 204 that are similar in both color and shape to the selected clip are retrieved. That is, all clips having similar color and shape keywords or mathematical representations are retrieved. In an alternative embodiment of the present invention, similar clips may be retrieved on the basis of color or shape alone, as well as the combination of both color and shape. After all of the clips of similar color and shape have been retrieved, the find similar clips user interface and the Visual Thesaurus user interface are closed (blocks 266 and 268, respectively). Then, at a block 270, the thumbnails of the retrieved clips, i.e., clips with colors and shape similar to the selected clip are then displayed by the multimedia applications program that invoked the Visual Thesaurus program. See FIG. 2E and the previous description. The display clips of similar color and shape logic then ends in a block 272.

Returning to FIG. 8, if in decision block 226, it is determined that the find similar color and shape function was not selected, the logic proceeds to a decision block 230 where a test is made to determine if the find (clips with) similar keyword(s) function was selected. If the find similar keyword(s) function was selected, the logic proceeds to a block 232 where clips with similar keyword(s) are displayed. Display clips with similar keywords logic suitable for use in the perform find similar clips function logic (FIG. 8) is illustrated in FIG. 11.

Figure 11:
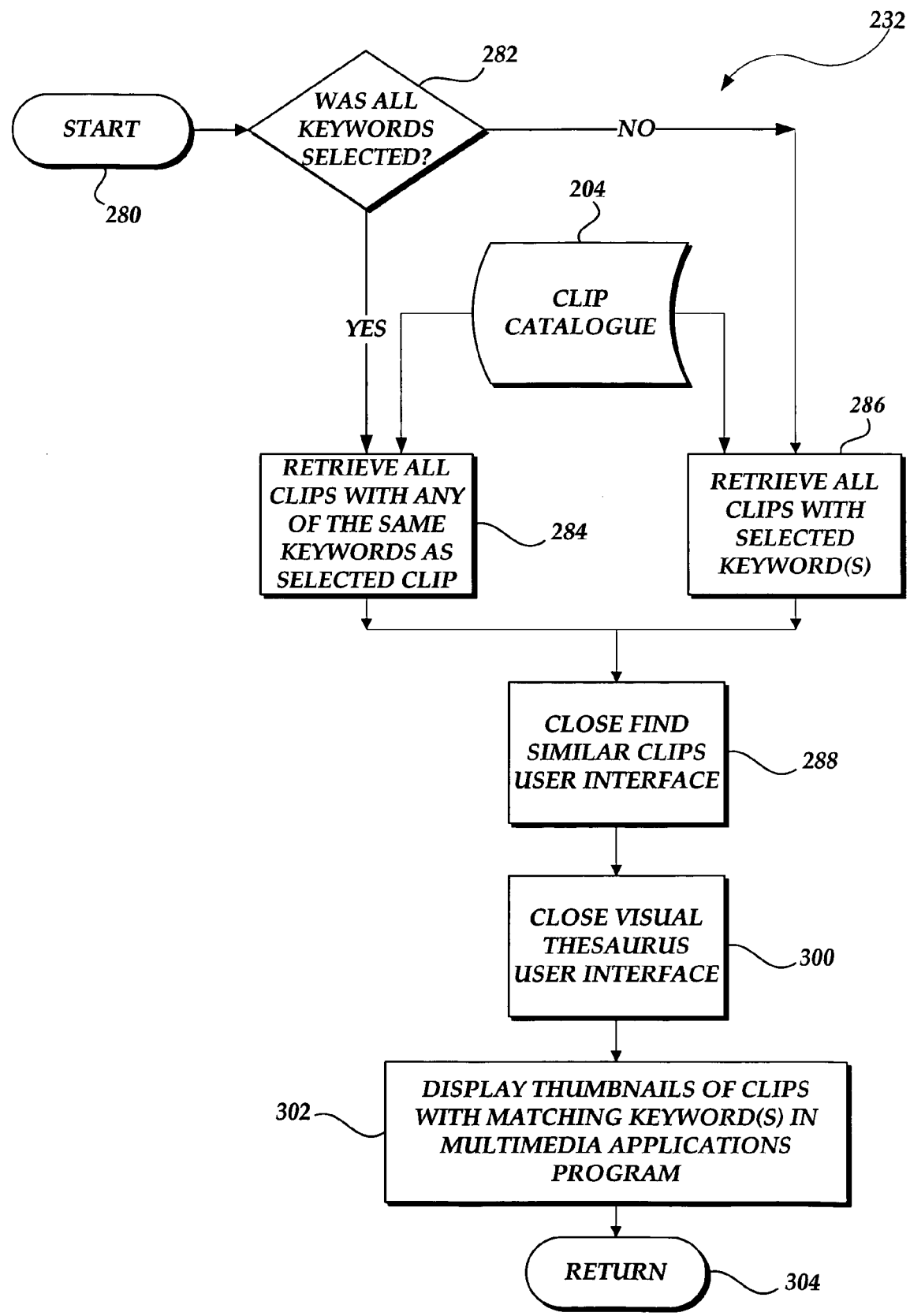
FIG. 11 is a flow diagram illustrating display clips with similar keywords function logic suitable for use in the perform find similar clips logic illustrated in FIG. 8.

The display clips with similar keywords logic illustrated in FIG. 11 begins in a block 280 and proceeds to a decision block 282 where a test is made to determine if all keywords was selected. If in decision block 282, it is determined that all keywords was selected, the logic proceeds to a block 284 where all clips containing at least one of the keywords associated with the selected clip are retrieved from the clip catalogue 204. In an actual embodiment of the present invention, the retrieved clips are sorted based on the number of matching keywords, with the clip thumbnail with the most keywords matching the selected clip being the first of the matching clips to be displayed after the selected clip thumbnail 70 in the clip display window.

If in decision block 282, it is determined that all keywords was not selected, the logic proceeds to a block 286 where all of the clips having keywords on a list of keywords selected by the user are retrieved. If more than one keyword is selected by the user, again, for display purposes the retrieved clips are sorted and displayed in numerical order based on the number of matching keywords. After all of the relevant clips have been retrieved based on matching all keywords (block 284), or single or multiple keywords (block 286), the logic proceeds to a block 288 where the find similar clips user interface is closed, followed by a block 300 where the Visual Thesaurus user interface is closed. The logic then proceeds to a block 302 where the thumbnails of the retrieved clips (block 284 or block 286) are displayed by the multimedia applications program that invoked the Visual Thesaurus program. The display clips with similar keywords logic then ends in a block 304.

Returning to FIG. 8, if in decision block 230 it is determined that the find similar keyword(s) function was not selected, the logic proceeds to a block 234 where the find similar clips user interface is closed. In an actual embodiment of the present invention, as shown in FIG. 2B, the find similar clips user interface can be closed, without performing a find similar clips function, by "pressing" a close button 99. After the appropriate find similar clips function, has been performed (block 224, 228, or 232), or if no find similar clips function is performed (block 234), the find similar clips function logic ends in a block 236.

Returning to FIG. 6, after the perform find similar clips function 196 has been performed, the find similar clips logic ends in a block 198. Returning to FIG. 5, if in decision block 184 it is determined that the find similar clips function was not selected, the logic proceeds to a block 188 where the Visual Thesaurus user interface is closed. In an actual embodiment of the present invention, this is the result of the user indicating a desire to exit from the Visual Thesaurus program. As will be readily appreciated by those familiar with Windows and other graphical user interface programs, a user can exit from the Visual Thesaurus program in a variety of ways, such as by "pressing" a close button on a user interface or pressing a designated key, such as the "escape" key on a keyboard 40. In FIG. 5, regardless of whether the user opted to perform one of the Visual Thesaurus functions or exit from the Visual Thesaurus program, after performing the user selection, the Visual Thesaurus logic ends in a block 189.

Returning to FIG. 3, after the selected Visual Thesaurus function is performed 142 and the Visual Thesaurus program has been closed, the user is returned to the multimedia applications program that invoked the Visual Thesaurus program. Depending on the user selection, the multimedia applications program may display the same clips that were displayed prior to invoking the Visual Thesaurus program, or different clips may be displayed. In any event, the logic next proceeds to a decision block 144 where a test is made to determine if the user has chosen to exit from the multimedia applications program, such as by the user pressing a "Close" button on the multimedia applications program user interface. If in decision block 144 it is determined that the user has chosen not to exit from the multimedia applications program, the logic returns to block 134, where the user selects another clip after which the foregoing Visual Thesaurus process is repeated. As will be appreciated by those skilled in this area of technology and others, the repetition of blocks 134-142 allows the user to perform successive iterations of queries by example. The repeating of blocks 134-142 continues until the user chooses to exit from the multimedia applications program (yes in decision block 144). When the user chooses to exit from the multimedia applications program, the logic ends in a block 146.

While the preferred embodiment of the invention has been illustrated and described, it will be appreciated that various changes can be made therein without departing from the spirit and scope of the invention. For example, search criteria other than artistic style and color and shape can be employed, if desired. Also, color and shape can be separate search criteria, if desired. Further, the sequence of actions illustrated in functional flow diagram form in FIGS. 3-11 can be changed. Hence, within the scope of the appended claims it is to be understood that the invention can be practiced otherwise than specifically described herein.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for providing a user interface for a visual thesaurus for a media clip database associated with a multimedia application program, wherein said media clip database contains information, including find similar clips indicia and keywords associated with media clips included in said media clip database, said find similar clips indicia including hidden criteria based on human judgment regarding the content of the media clip that identifies and/or groups media clips, said method comprising:

directly in response to a user beginning a search by selecting a media clip from said media clip database, displaying to the user an option for finding similar media clips that have an associated find similar clips indicia and/or a keyword that matches the find similar clips indicia, human judgment and/or a keyword associated with the selected clip, said keywords displayed to the user in a list box, the list box including each of said keywords listed separately, each keyword being individually selectable, the list box also including an additional list entry that permits selection of all said keywords.

2. The method of claim 1, wherein the user interface comprises:

(a) a graphical indication of the selected clip; and
(b) a button for the option for finding similar clips to the selected clip.

3. The method of claim 1, further comprising, in response to a user selecting the option for finding similar clips, displaying means for the user to select search criteria for finding similar clips, wherein said search criteria includes a keyword that matches the find similar clips indicia, human judgment and/or a keyword associated with said selected clip.

4. The method of claim 3, wherein means for the user to select search criteria for finding similar clips is a fly-out window.

5. The method of claim 1, further comprising displaying to the user an option for inserting the selected clip into a document.

6. The method of claim 1, further comprising displaying to the user an option for previewing the selected clip.

7. The method of claim 1, further comprising displaying to the user an option to add the clip to one or more categories.

8. A method of searching a media clip database associated with a multimedia application program, wherein said media clip database contains information, including keywords and find similar clips indicia associated with media clips included in said media clip database, said find similar clips indicia including hidden criteria based on human judgment regarding the content of the media clip that identifies and/or groups media clips, said method comprising:

(a) in response to a user beginning a search by selecting a media clip, retrieving information, including find similar clips indicia and keywords, associated with said selected media clip from said media clip database;

(b) simultaneously presenting to the user for selection by the user:
  (i) a list box including said keywords associated with said selected media clip, the list box including each of said keywords listed separately, each keyword being individually selectable, the list box also including an additional list entry that permits selection of all said keywords; and
  (ii) said find similar clips indicia associated with said selected media clip; and
(c) in response to the user creating search criteria by selecting one or more of said keywords and/or said find similar clips indicia associated with said selected media clip, retrieving all media clips in said media clip database that match the search criteria created by the user.

9. The method of claim 1, further comprising presenting a user with all of the retrieved clips.

10. The method of claim 9, further comprising, in response to a user selecting one of the retrieved clips and the user creating a search criteria for the newly selected clip, retrieving all clips in the clip database that match the search criteria for the newly selected media clip.

11. The method of claim 1, further comprising presenting a plurality of media clips available for selection to a user.

12. The method of claim 11, wherein the media clips are based on a media type.

13. The method of claim 1, wherein said human judgment is based on artistic style.

14. The method of claim 1, wherein said human judgment is based on color.

15. The method of claim 1, wherein said human judgment is based on shape.

16. The method of claim 1, wherein said human judgment is based on both color and shape.

17. The method of claim 1, wherein the keywords are a list of keywords.

18. The method of claim 1, wherein the keywords designate the format of the clip.

19. The method of claim 1, wherein said retrieving all clips in said clip database that match the search criteria created by the user applies only to clips having a media type that matches the media type of the selected media clip.

20. An apparatus for searching a plurality of media clips, comprising:
(a) a processing unit; and
(b) a storage medium coupled to the processing unit, the storage medium storing program code implemented by the processing unit for:
  (i) providing an interface for a user to begin a search by selecting a media clip from a media clip database associated with a multimedia application program, wherein said media clip database contains information, including find similar clips indicia and keywords associated with media clips in said media clip database, said find similar clips indicia including hidden criteria based on human judgment regarding the content of the media clip that identifies and/or groups media clips, said apparatus;
  (ii) providing an interface for the user to select search criteria based on find similar clips indicia and/or a keyword associated with said selected media clip, said keywords displayed to the user in a list box, the list box including each of said keywords listed separately, each keyword being individually selectable, the list box also including an additional list entry that permits selection of all said keywords; and
  (iii) in response to the user selecting the media clip and the search criteria, retrieving all media clips in the media clip database that have associated find similar clips indicia and/or a keyword that matches the selected search criteria for the selected media clip.

* * * * *

UNITED STATES PATENT AND TRADEMARK OFFICE
CERTIFICATE OF CORRECTION

PATENT NO. : 7,730,426 B2  
APPLICATION NO. : 11/449430  
DATED : June 1, 2010  
INVENTOR(S) : Dean A. Slawson et al.

Page 1 of 1

It is certified that error appears in the above-identified patent and that said Letters Patent is hereby corrected as shown below:

In column 15, line 16, in Claim 9, delete "claim 1," and insert -- claim 8, --, therefor.

In column 15, line 23, in Claim 11, delete "claim 1," and insert -- claim 8, --, therefor.

In column 15, line 27, in Claim 13, delete "claim 1," and insert -- claim 8, --, therefor.

In column 15, line 29, in Claim 14, delete "claim 1," and insert -- claim 8, --, therefor.

In column 15, line 31, in Claim 15, delete "claim 1," and insert -- claim 8, --, therefor.

In column 15, line 33, in Claim 16, delete "claim 1," and insert -- claim 8, --, therefor.

In column 15, line 35, in Claim 17, delete "claim 1," and insert -- claim 8, --, therefor.

In column 16, line 1, in Claim 18, delete "claim 1," and insert -- claim 8, --, therefor.

In column 16, line 3, in Claim 19, delete "claim 1," and insert -- claim 8, --, therefor.

Signed and Sealed this
First Day of February, 2011

David J. Kappos
*Director of the United States Patent and Trademark Office*